(12) United States Patent
Zandman et al.

(10) Patent No.: US 8,161,829 B2
(45) Date of Patent: Apr. 24, 2012

(54) CIRCUIT COMPENSATION IN STRAIN GAGE BASED TRANSDUCERS

(75) Inventors: Felix Zandman, Malvern, PA (US);
Robert B. Watson, Clayton, NC (US);
Thomas P. Kieffer, Wake Forest, NC (US)

(73) Assignee: Vishay Precision Group, Inc., Malvern, PA (US)

( * ) Notice: Subject to any disclaimer, the term of this patent is extended or adjusted under 35 U.S.C. 154(b) by 0 days.

(21) Appl. No.: 12/844,999

(22) Filed: Jul. 28, 2010

(65) Prior Publication Data
US 2011/0023630 A1 Feb. 3, 2011

Related U.S. Application Data

(60) Provisional application No. 61/229,123, filed on Jul. 28, 2009.

(51) Int. Cl.
*G01L 1/00* (2006.01)
*G01L 5/24* (2006.01)
(52) U.S. Cl. ............... 73/862.622; 73/862.627; 73/765
(58) Field of Classification Search .............. 73/766, 73/862.623, 862.627
See application file for complete search history.

(56) References Cited

U.S. PATENT DOCUMENTS

| | | | | |
|---|---|---|---|---|
| 3,949,603 A * | 4/1976 | Laimins | ............... | 73/862.622 |
| 4,951,765 A * | 8/1990 | Naito et al. | ............... | 177/211 |
| 5,031,463 A * | 7/1991 | Hess | ............... | 73/766 |
| 5,308,931 A * | 5/1994 | Griffen | ............... | 177/25.14 |
| 5,629,489 A * | 5/1997 | Hipkiss et al. | ............... | 73/862.622 |
| 5,847,290 A * | 12/1998 | Kim | ............... | 73/862.641 |
| 7,024,315 B2 * | 4/2006 | Giurgiutiu | ............... | 702/33 |
| 2002/0050174 A1 * | 5/2002 | Valdevit et al. | ............... | 73/795 |
| 2002/0083578 A1 * | 7/2002 | Naito et al. | ............... | 29/606 |
| 2005/0109124 A1 * | 5/2005 | Greszczuk | ............... | 73/862 |
| 2005/0132820 A1 * | 6/2005 | Eilersen | ............... | 73/862.625 |
| 2005/0211003 A1 | 9/2005 | Yoshikuwa | | |
| 2006/0248961 A1 * | 11/2006 | Shachar et al. | ............... | 73/861.24 |
| 2006/0288795 A1 * | 12/2006 | Kieffer et al. | ............... | 73/795 |
| 2007/0245840 A1 * | 10/2007 | Wendelbo et al. | ............... | 73/865 |
| 2008/0236300 A1 * | 10/2008 | Mueck et al. | ............... | 73/862.627 |
| 2008/0262774 A1 * | 10/2008 | Fasig et al. | ............... | 702/101 |
| 2009/0057038 A1 * | 3/2009 | Kusumoto | ............... | 177/211 |
| 2010/0313668 A1 * | 12/2010 | Tao et al. | ............... | 73/800 |
| 2011/0023630 A1 * | 2/2011 | Zandman et al. | ............... | 73/862.623 |

FOREIGN PATENT DOCUMENTS

| | | |
|---|---|---|
| JP | 2000-275116 A | 10/2000 |
| JP | 2003-322571 A | 11/2003 |

OTHER PUBLICATIONS

Hoffmann, Karl, "Anwendung der Wheatstoneschen Bruckenschaltung".
International Search Report and Written Opinion for PCT Application No. PCT/US10/043520 filed on Jul. 28, 2010.

* cited by examiner

*Primary Examiner* — Lisa Caputo
*Assistant Examiner* — Jonathan Dunlap
(74) *Attorney, Agent, or Firm* — Volpe and Koenig, P.C.

(57) ABSTRACT

A methodology for selecting and properly placing foil strain gages on a transducer in a Wheatstone bridge, which provides a more consistent creep response, especially when the transducer temperature is changed. A transducer includes a counterforce subjected to a predetermined physical load that provides tension and compression strains (positive and negative, respectively). The transducer also includes a plurality of strain gage grids that are operatively attached to the counterforce in the tension and compression strain areas of the counterforce and generate electrical signals. The plurality of strain gages are electrically connected in a Wheatstone bridge circuit where their electrical signals due to creep are cancelled.

5 Claims, 8 Drawing Sheets

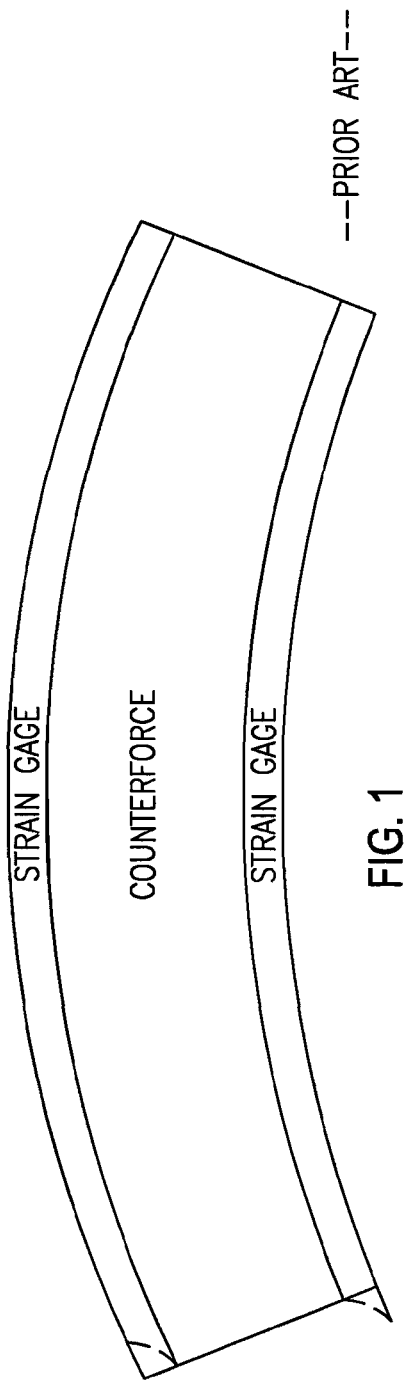
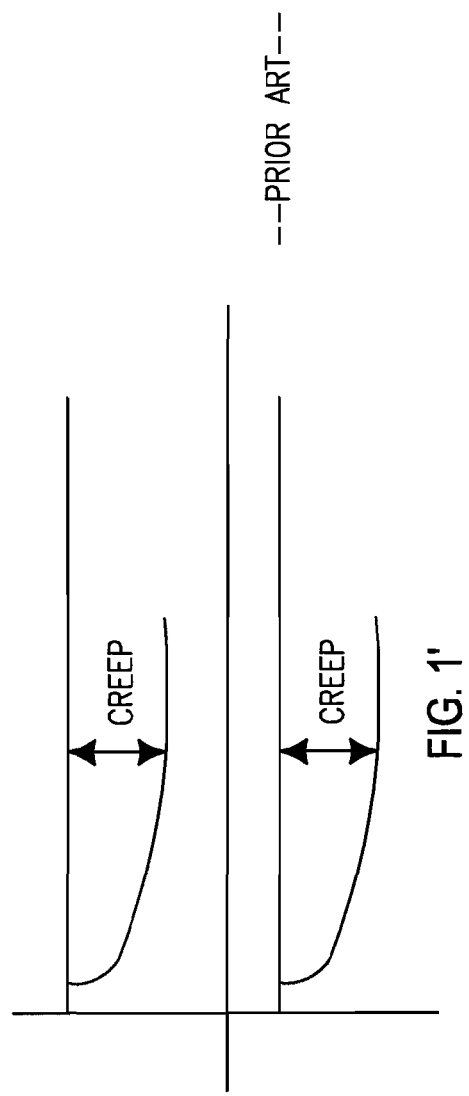
FIG. 1 --PRIOR ART--
FIG. 1' --PRIOR ART--

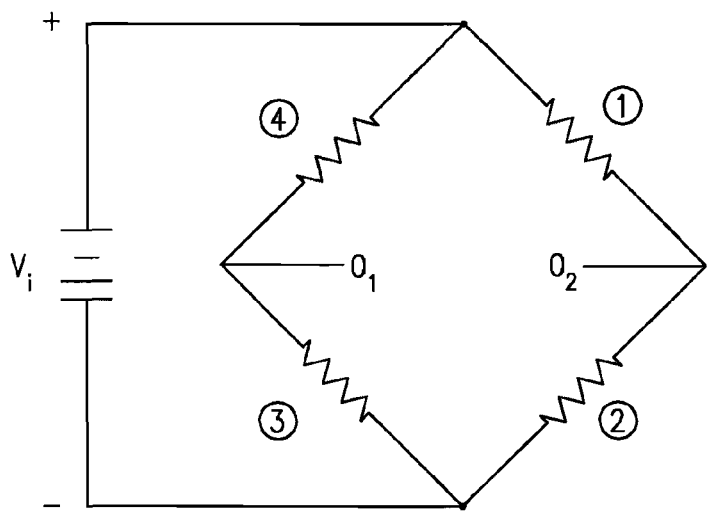
FIG. 2 —PRIOR ART—
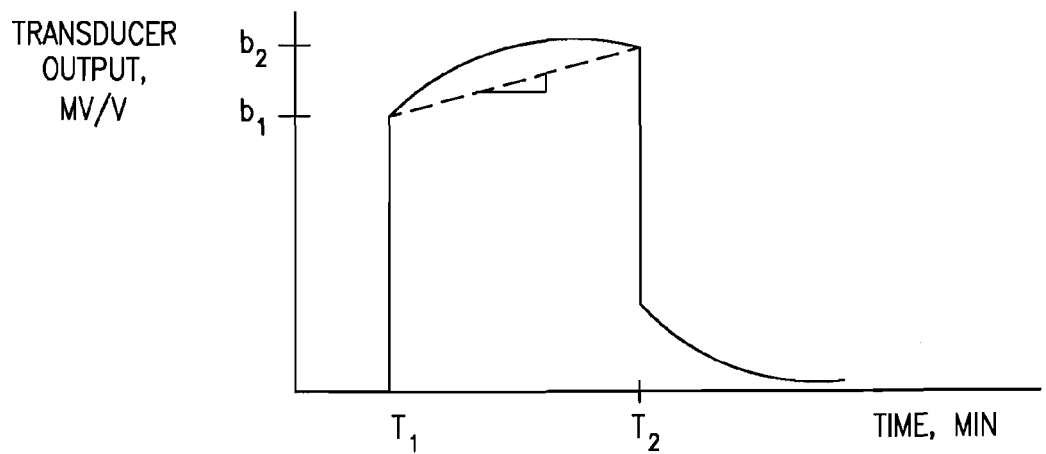
$T_1$ – POINT OF LOAD APPLICATION
$T_2$ – POINT OF LOAD REMOVAL
CORD SLOPE CREEP IN %FS = $\dfrac{b_2 - b_1}{T_2 - T_1} \times 100$
$b_1$ = FULL SCALE OUTPUT (FS)
$b_2$ = OUTPUT AT $T_2$ (CREEP OUTPUT)
$T_1$ = TIME OF LOAD APPLICATION
$T_2$ = TIME OF LOAD REMOVAL
FIG. 3A —PRIOR ART—

--PRIOR ART--

--PRIOR ART--

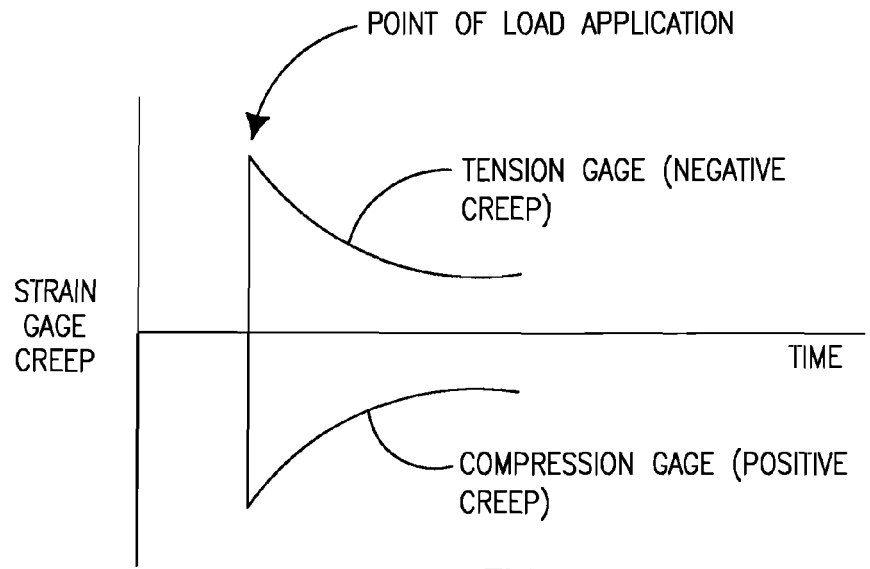
FIG. 5  --PRIOR ART--
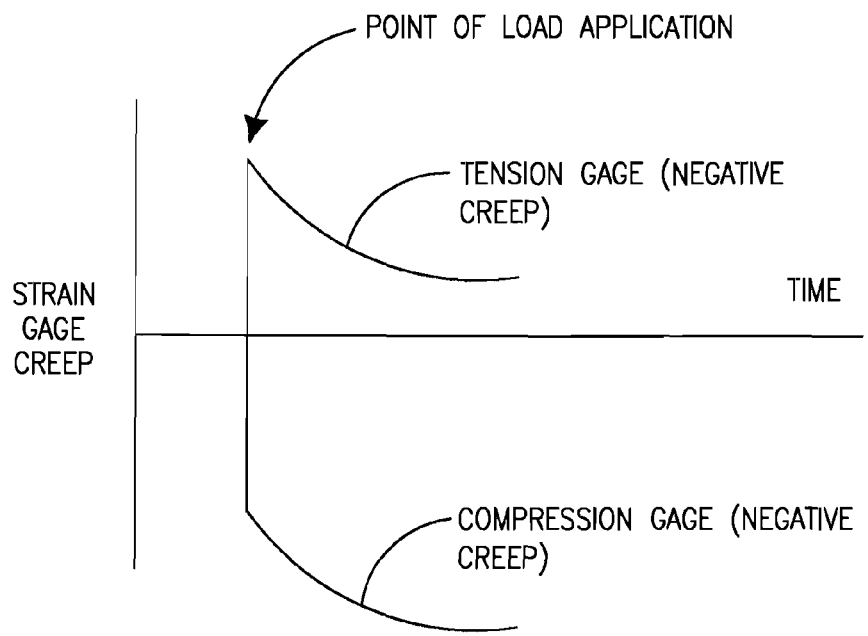
FIG. 6

$$\frac{e_3}{E} = \frac{1+F_1}{2+F(\mathcal{E}_1+\mathcal{E}_4)} - \frac{1+F\mathcal{E}_2}{2+F(\mathcal{E}_2+\mathcal{E}_3)}$$

$\mathcal{E}_n$ =  STRAIN MAGNITUDE SENSED BY RESPECTIVE STRAIN GAGE

F =  GAGE FACTOR $\frac{e_0}{E}$ =  RELATIVE BRIDGE OUTPUT

CIRCUIT COMPENSATION IN STRAIN GAGE BASED TRANSDUCERS

CROSS REFERENCE TO RELATED APPLICATION(S)

This application claims the benefit of U.S. Provisional Application No. 61/229,123 filed Jul. 28, 2009, which is incorporated by reference as if fully set forth.

FIELD OF INVENTION

The present disclosure relates to strain gages and more particularly, to strain gages including creep compensation.

BACKGROUND

Strain gage based transducers are used in a variety of applications to convert mechanical inputs (for example, weight, force, mass, torque, pressure, deflection/displacement) into an electrical output. The basis for all such devices is the same. Specifically, a mechanical reaction device (commonly called a spring or counterforce) is designed to respond to the specific input, transducing the input into a measurable surface strain, which changes proportionally with the applied input. Strain gages attached to the transducer counterforce sense and respond to this surface strain with a change in electrical resistance. The counterforce is normally machined from high-quality tool steel (e.g., 4340 or 4140), or highly processed (hardened/heat treated) stainless steel (e.g., 17-4 PH or 17-7 PH), or high-grade, heat treated aluminum (e.g., 2024-T351 or 2024-T81), or other excellent spring materials like beryllium copper or N-Span C. However, there are special cases where polymers are used (e.g., epoxy-glass laminate, or cast/injection molded plastics), and where ceramic materials are used (e.g., $Al_2O_3$ 99+ percent). In fact, over the course of transducer history, practically every conceivable material has been used at one time or another as the basis for a counterforce. The present invention is not limited to any one material or even to a class of materials; it works well with any material selected for use as a counterforce.

In all cases, strain gage based transducers are used to convert physical loads or inputs into electrical outputs. Achieving the highest level of transducer accuracy requires compensating the device for certain accuracy-limiting effects; some of which are inherent to the strain gage/transducer system, like creep, and some of which are external effects, like changes in temperature, and some of which are a combination, like creep change with temperature, called creep TC. As an example, load cells are used in the weighing industry as transducers to convert a weight (mass/force) into a proportional electrical signal. The load cell is designed mechanically to provide repeatable and quasi-equal-magnitude surface strains at specific points, whereby two of the strains are tensile (positive) and two are compressive (negative). Electrical resistance strain gages bonded at these points convert the surface strains resulting from an applied weight into a proportional electrical signal. The strain gages are connected into an electrical circuit, typically a Wheatstone bridge, which optimizes the output signal.

In the Wheatstone bridge electrical circuit typically used in transducers, four strain gages, plus a power source, are wired together in the series/parallel circuit as depicted in FIG. 2. The electrical nature of this circuit is such that when the bridge is resistively balanced (i.e., all four gages are at nearly the same resistance value) there is no voltage present across the output terminals (O1 and O2). Conversely, when the strain gages are at meaningfully different resistances, there can be a small voltage measured across O1 and O2, proportional to the applied voltage, $V_i$. Specifically, when gages 1 and 3 increase in electrical resistance and gages 2 and 4 simultaneously decrease in electrical resistance, the maximum proportional output voltage is presented across terminals O1 and O2. It is for this reason that transducer designs incorporate positive and negative strains, so gages bonded at those locations will increase and decrease resistance, respectively, with applied weight; thus, maximizing the voltage signal from the transducer for a given applied weight (maximizing sensitivity).

Within the weighing industry there is a class of load cells used in applications called legal-for-trade. These legal-for-trade load cells must pass stringent qualification tests from internationally recognized standards, such as OIML R60 (Organization Internationale de Metrologie Legal). Results from these tests classify the load cell over a specified temperature range (normally −10 to +40° C.) based upon achievable resolution of weight. The classification metric used is divisions of resolution. For example, a load cell having a maximum combined error of 0.033% is classified as 3000D (3000 divisions) accuracy.

Several factors conspire to affect the classification category of a load cell, including the mechanical design and production of the load cell body, and performance characteristics of the strain gage and its installation. Among the strain gage performance parameters, creep is critical to load cell classification. Ignoring all other error contributions, the allowable cord-slope creep within the example classification (3000D) is 0.0233% FS/min. (percent full-scale per minute).

Transducer creep is defined as a changing output with a stable physical condition or input (weight, in the case of the load cell example) under steady state environmental conditions. Strain gages are custom designed to compensate for the inherent material creep of specific transducer designs. A representative plot of creep for the load cell example is shown in FIG. 3a, which also indicates the chord slope value normally used to quantify the creep, even though the figure clearly shows that creep is a nonlinear phenomenon. Further, creep performance can change, and usually does change using prior creep correction methods, when the transducer temperature is changed from that which was used for initial creep compensation (normally room temperature, T which is ~24° C.). Changes in creep with temperature can significantly affect the possible classification of a legal-for-trade load cell. The results from creep measurements over a specified temperature range are termed creep TC. In some server application, the temperature range can be T+/−200° C.

Several variables affect strain gage creep, including but not limited to, the resistive material (electrical conductor) from which the strain gage is produced, geometry (e.g., gage length, cross-section dimensions, end loop size, shape, and orientation), construction (materials used in building the gage, including insulating backing and insulating overlay, if present), and installation (thickness and type of cement, gage positioning). The most common type strain gage used in transducers is the thin, metal-foil variety, depicted schematically in FIG. 4. The gage consists of a primary measurement length (gage length), L, a primary measurement width (gage width), Z, a plurality of grid lines, T, configured into a serpentine grid, R, with solder pad connections, M, a plurality of creep controlling end loops, K, an upper alignment guide, P, and a lower alignment guide, N, defining the major measurement axis, J, and an insulating backing (carrier), U.

Prior methods allow for convenient control of transducer creep at room temperature to about 0.0175%/min of rated full-scale output; or, when calculating from OIML R60 for the load cell example, a little over 4000D. One prior method of achieving creep compensation is to select the strain gage end loops (K in FIG. 4) to optimize the creep component. This, of course, presumes proper control of the other previously mentioned effects on creep. This method utilizes four identical, or nearly identical strain gages, with the end loop lengths chosen to provide a chord slope creep as small as possible or, at the least, sufficient for the intended classification. When attempting to achieve the lowest creep slope possible (highest transducer resolution) from a production run of transducers using this prior method, it is typically necessary to grade the production lot, whereby all transducers from the lot are tested and classified by their test results, with no a priori guarantee that any individual transducer from the lot will achieve a high standard.

A subtle variation on the above mentioned prior method of creep compensation is to pick end loop lengths for the strain gages slightly different from one another. With this method, there may be three strain gages with equal end loop lengths and one different; or, two gages with equal end loop lengths and the other two equal, but different from the first two; or, all gages may have a slightly different end loop length. This minor difference of creeping characteristic is achieved using what might be referred to as nearly identical strain gages. This practice primarily evolved from the practical concern over what gages happened to be on-hand when building the transducer, and happen to combine for a low creep result; that is, the method evolved naturally because of inventory practicality. While achieving an excellent creep result at one temperature is possible using the method, it does not, however, necessarily provide any improvement in creep TC performance over the more commonly practiced use of identical strain gages.

Another method of achieving transducer creep compensation has been suggested, whereby the overall stiffness of the strain gage is altered by varying the amount of reinforcing fibers mixed with the backing resin. This method is grounded in the relationship between creep and the relative stiffness difference between the counterforce and the strain gage. One obvious limitation with this technique is its applicability only to mixed-resin backing systems, which is not the dominant type used within the industry.

Achieving high resolution creep compensation over the entire −10 to +40° C. temperature range is a challenging aspect of these prior methods. In another method, various electrical configurations are designed into the strain gage circuit and are formed with the strain gage grids at the time of etching. These configurations are initially electrically inert, but when subsequently introduced into the circuit as active elements by cutting appropriate electrical shunts, the transducer can be creep compensated, including any variation in creeping caused by a change in temperature. This work is performed after the gage has been installed on the transducer. Disadvantages of this method are 1) more complex and costly strain gage design and production; and, 2) careful and selective 'trimming' of the creep characteristic in situ.

It is known that strain gage creep, as exhibited by transducer output, is a viscoelastic phenomenon, as illustrated in FIG. 1. As such, when utilizing prior methods of creep compensation, including the method of choosing gages with identical end loops and the method of choosing gages with nearly identical end loops, a typical transducer creep result can be represented by the graph shown in FIG. 1'. Shown in FIG. 5 is a corresponding representative independent strain gage creep from the tension and compression strain gages bonded to a load cell, which combine in the Wheatstone bridge circuit to cause the total transducer creep. From FIG. 5, it is obvious that the direction of creep, as represented by the two curves for change in output with time (one curve for tension strain gages and one for compression strain gages), is opposite in sign; the tension gages are shown decreasing in output (becoming more negative) and the compression gages are shown increasing in output (becoming more positive). As noted previously for the characteristic nature of the Wheatstone bridge, the electrical result from the bridge (the proportional output voltage) of these two opposing creep directions is an increase in that part of the electrical signal caused by creep; subtracting opposite sign signals results in addition of the two signals.

Thus, the prior methods have embraced a common result, where creep compensation is achieved via physical cancelling (viz., the positive counterforce creep is countered by the combined negative tension/compression strain gage creep), but it has not addressed the problem through electrical cancelling as disclosed herein.

OVERVIEW OF THE INVENTION

Disclosed herein is new methodology for selecting and properly placing foil strain gages on a transducer in the Wheatstone bridge, which provides a more consistent creep response, especially when the transducer temperature is changed. An especially advantageous transducer counterforce is the so called binocular or reverse-bending design, whereby two locations on the counterforce have small areas of concentrated tension strain and two locations have small areas of concentrated compression strain. Coincidentally, there is one each of the two opposite strains on the top and one each of the two opposite strains on the bottom of the counterforce. Strain gages with the appropriate creeping characteristic, as disclosed herein, are attached to the counterforce at these four locations; tension strain gages attached over the tension areas and compression strain gages attached over the compression areas. This counterforce design is particularly attractive because effects from temperature gradients along the length of the counterforce, not necessarily associated with creeping, are naturally compensated by the bridge circuit.

Prior methods for correction of transducer creep relied on precisely matching the inherent positive creep of deadweight loaded transducers to an equal negative creep by the strain gages; thus, a balance is struck between the two independent creeps [transducer creep+(combined creep of the four strain gages)=0], resulting in a steady transducer output with time. Intrinsic to this correction is that total creep from the four strain gages is matched to compensate the transducer creep, without concern for relative creep matching between the strain gages (all gages are chosen equal or nearly equal). By default, this requires that the combined strain gage creep be opposite in sign to the transducer creep.

The techniques disclosed herein use the electrical nature of the Wheatstone bridge circuit. Referring to FIG. 3a, instead of matching strain gage creep precisely to the creeping of the transducer counterforce, the two tension strain gages are picked to provide an equal magnitude and same-sign creep result as the two compression strain gages (both positive, for example). These representative strain gage creep curves are shown in FIG. 6. Resulting from the arithmetic of Wheatstone bridge circuits, when the equal resistance changes caused by creep from the tension and compression strain gages combine in the bridge circuit, they cancel; thereby, cancelling the creeping result, as depicted in FIG. 7. Thus, the combined strain gage creep is no longer an exact, but opposite in sign match to the creep of the deadweight loaded transducer counterforce, as in prior methods, but is instead a match between the tension and compression strain gage creeping characteristics, such that each will combine and cancel in the Wheatstone bridge.

For example, it is only necessary to choose compression strain gages with significant positive creeping, and then match the tension strain gages with equal positive creeping. There is no further need to pick strain gages with creeping precisely matched, but opposite in sign, to the transducer counterforce.

An advantageous embodiment of this structure is stable transducer creep performance when the transducer temperature is changed from that at which initial creep correction is accomplished (improved creep TC); for example, over the entire legal-for-trade temperature range of −10 to +40° C. When choosing tension strain gages with matching positive creep to the compression strain gages [by choosing tension strain gages with much shorter end loops than those used for compression strain gages—one-half the length (50%), for example], then the creep change with temperature can be made equal between tension and compression strain gages and the creep signal component at any temperature is cancelled in the Wheatstone bridge. This advantageous embodiment is made possible because of the similar creep TC characteristic obtained when strain gages are properly selected for positive tension and compression creeping, as opposed to the selection of identical or nearly identical strain gages using prior methodology, where the tension and compression strain gages exhibit different creep TC characteristics.

BRIEF DESCRIPTION OF THE DRAWINGS

A more detailed understanding may be had from the following description, given by way of example in conjunction with the accompanying drawings:

FIG. 1 illustrates that strain gage creep, as exhibited by transducer output, is a viscoelastic phenomenon;

FIG. 1' is a graph showing typical transducer creep;

FIG. 2 shows a Wheatstone bridge electrical circuit typically used in association with transducers;

FIG. 3a is a graph showing a representative plot of creep for a load cell;

FIG. 5 is graph showing strain gage creep from tension and compression strain gages bonded to a load cell (negative and positive creep);

FIG. 6 is graph showing strain gage creep from tension and compression strain gages bonded to a load cell (both negative creep);

FIG. 9b is Wheatstone bridge electrical circuit coupled to the transducer of FIG. 9a.

DETAILED EXAMPLES

Figure 4:
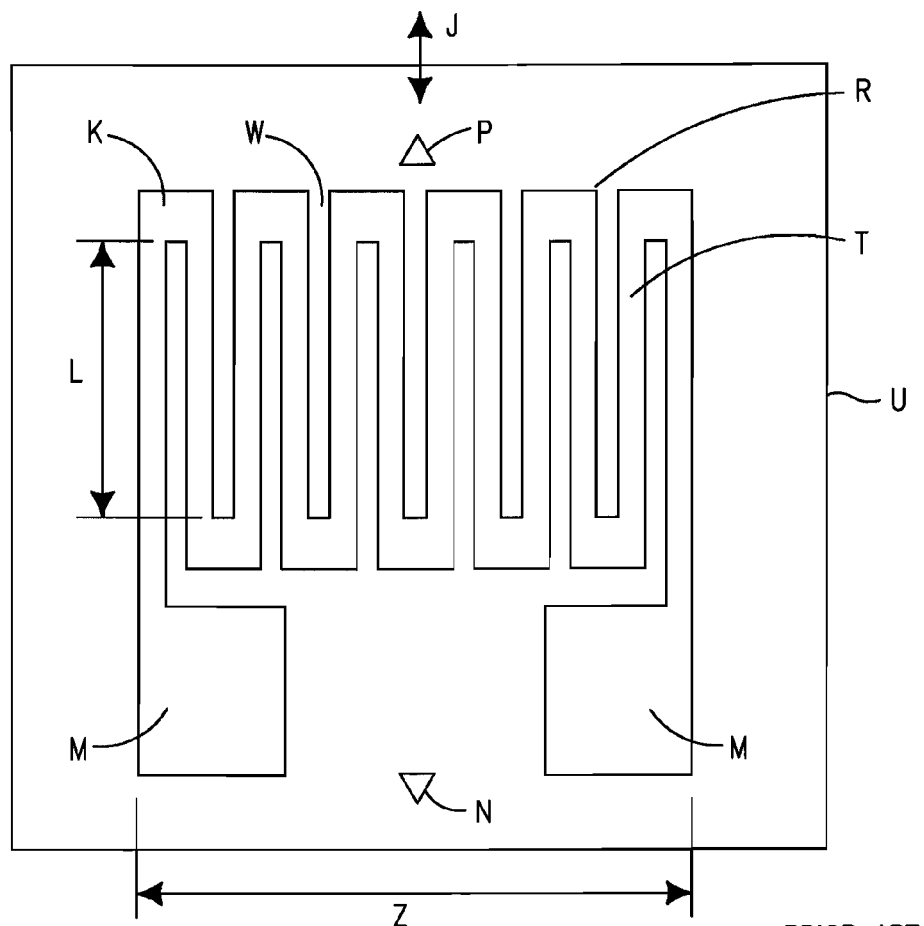
FIG. 4 is a drawing of a strain gage.
Figure 7:
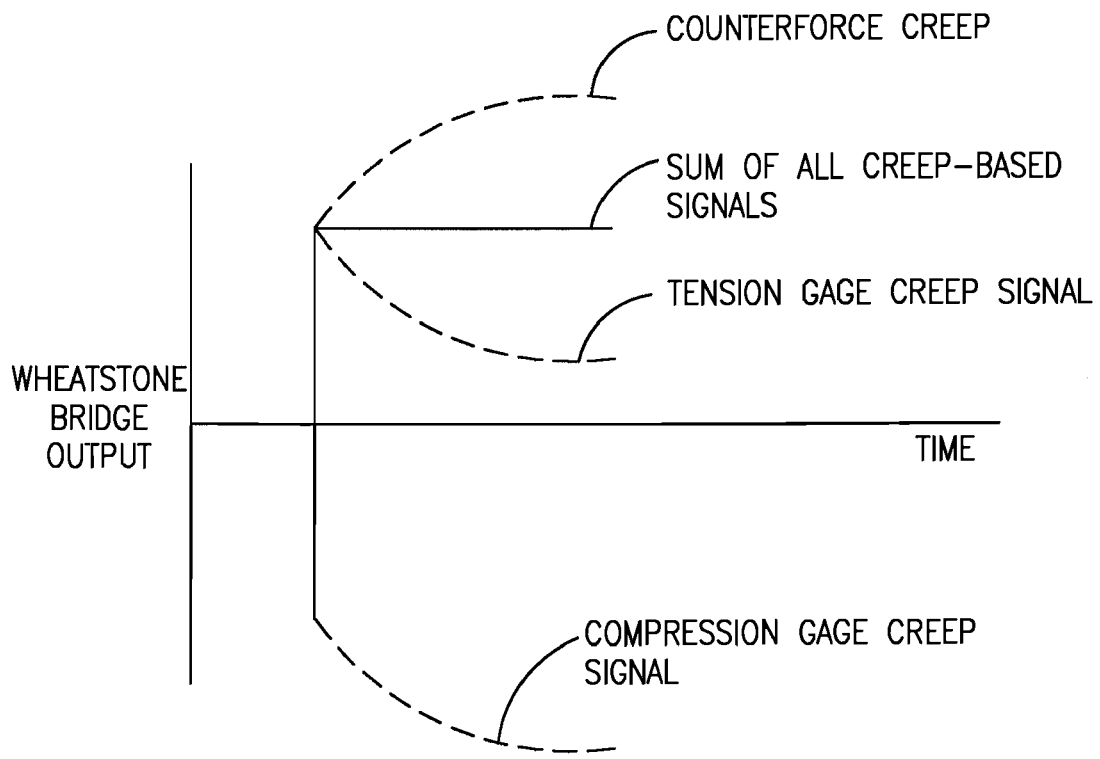
FIG. 7 is graph showing strain gage creep with creep cancellation.
Figure 8:
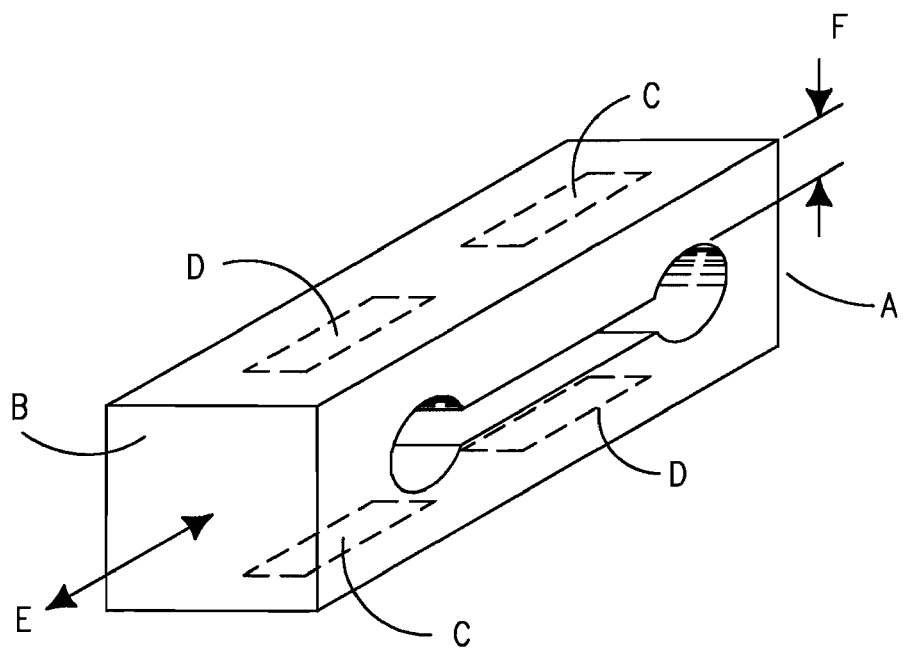
FIG. 8 is a drawing of a binocular transducer with counterforce design.

FIG. 8 illustrates a binocular transducer counterforce design. The counterforce is fixed at one end, A, and loaded with a deadweight (physical load) on the opposite end, B. The locations indicated by C are areas of tension strain (positive) and the locations indicated by D are areas of compressive strain (negative). Strain gages are normally attached with their major measurement axis (J in FIG. 4) aligned with the major measurement axis E of the counterforce. If it is desired to compensate for other responses of the transducer from weight or environment, the strain gage may be offset slightly (rotated or displaced) from perfect alignment in the direction of E, the disclosed structure remains valid and works well.

Figure 9A:
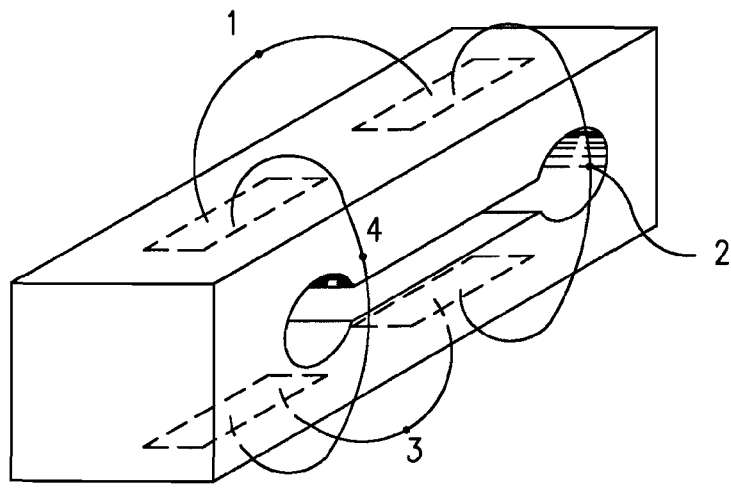
FIG. 9a is a drawing of a binocular transducer showing the location of the various electrical connections (1, 2, 3, 4)
Figure 9B:
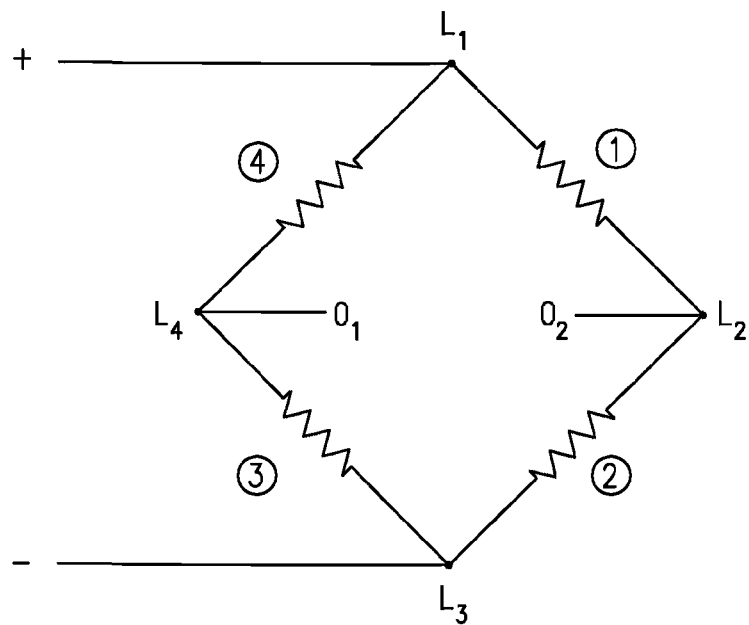

The strain gages are fixed to the counterforce, such as by an adhesive, direct lamination or some other process, and are wired into a Wheatstone bridge circuit as illustrated in FIG. 9b. The only criterion being that the four strain gages are suitably electrically connected into a Wheatstone bridge circuit. Electrical connections $L_1$, $L_2$, $L_3$ and $L_4$ form the supply and signal terminal sets, respectively, for the transducer (FIG. 9a). Also shown in FIG. 9b is the governing equation for relative bridge voltage output, $e_0/E$, expressing the dependence of this parameter on the strain levels of each strain gage. From this expression, it can be demonstrated that the combined contribution of strain gages 1 and 2, relative to bridge voltage output, is subtractive. As such, if the same signal is present from both gages, the combined result on relative bridge voltage is null (the difference between two equal signals equals zero). This is the basis for the structure disclosed herein. That being, choose strain gages with matching creeping characteristic between tension and compression gages, regardless of the transducer creeping characteristic, and combine these two equal signals in the bridge such that they cancel electrically.

Figure 3B:
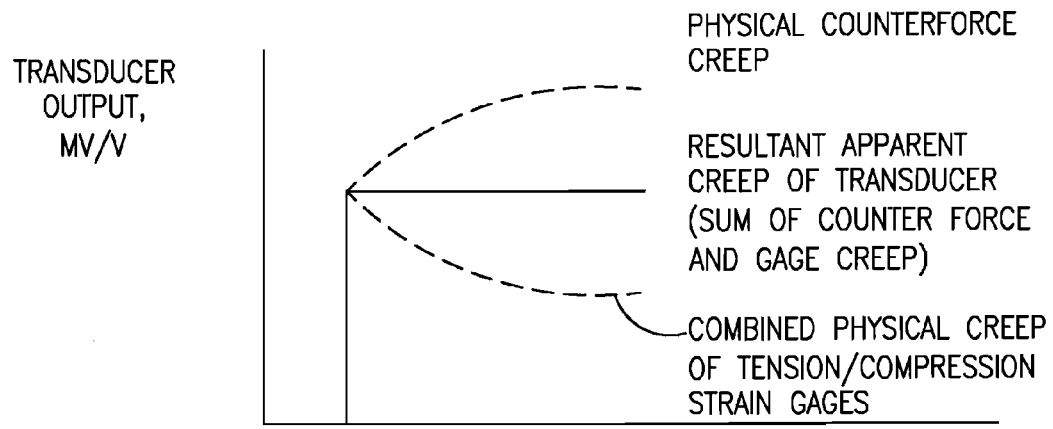
FIG. 3b is a graph showing physical creep cancellation action.

In the prior methods, creep compensation is effected by the physical relaxation of the strain gages countering the physical extension of the counterforce. Since the strain gages relax at the same rate as the counterforce is extending, there is no change in electrical resistance of the strain gages and no change in output signal from the Wheatstone bridge. This physical creep cancellation action is depicted in FIG. 3b, where the creep curve for the strain gages (lower curve), when subtracted from the creep curve for the counterforce (upper curve), yields a stable electrical output signal from the transducer.

In contrast to prior methods of physical creep correction, this disclosure is directed to the use of the summing characteristic of the Wheatstone bridge to achieve creep correction electrically. By adjusting the strain gage creeping characteristic such that the creep strain signal is equal in magnitude and of the same sign between the tension and compression strain gages, then when these equal creep signals are combined in the bridge (for strain gages 1 and 2), and for strain gages 3 and 4), the resultant is zero and the creep signal is electrically cancelled.

As previously indicated, an advantage of this matching of creep strain signal, and an important improvement is that by correctly accomplishing the strain gage creep matching, creep TC is also improved. In one example, the matching is accomplished by using a very long end loop configuration for the compression strain gages, relative to the tension strain gages. Specifically, when the web thickness, F, in FIG. 8 is 2.10 mm, and the counterforce is machined from 2024-T351 Aluminum, or equivalent (producing a transducer with approximately 30 kg capacity), then using tension strain gage end loops of 0.1778 mm length and compression strain gage end loops of 0.4382 mm length, with all other design and construction parameters between the two sets of strain gages being equal, will provide excellent room temperature creep compensation and creep TC, as compared to prior methods. It should be appreciated that other methods of adjusting strain gage creep (by changing relative grid design—lines and spaces—of the tension and compression strain gages, for example; or, by changing carrier material between the tension and compression gages, as another example) are available and those methods are also claimed as part of the present invention.

Figure 10:
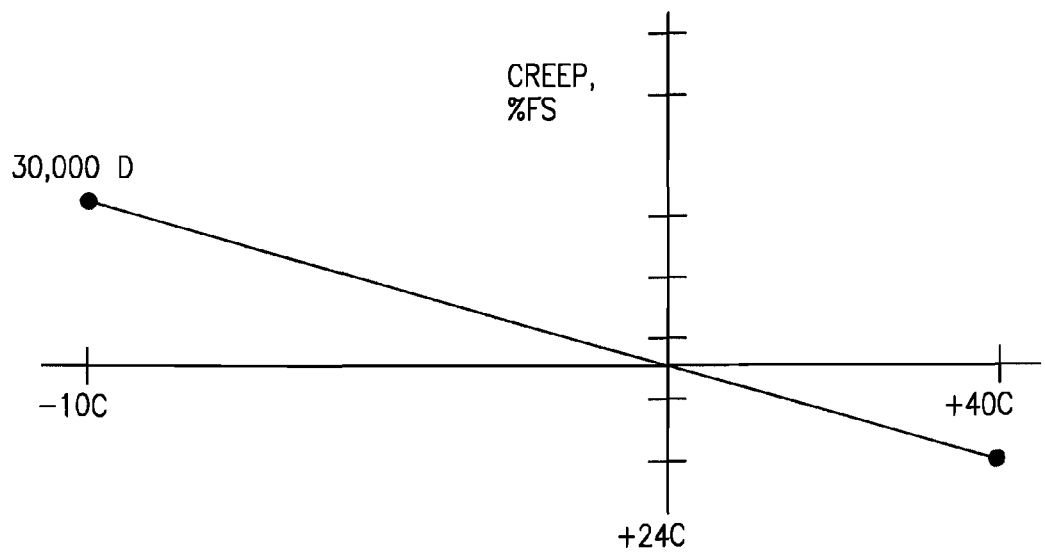
FIG. 10 is a graph showing a plot of transducer creep (including room temperature creep)
Figure 11:
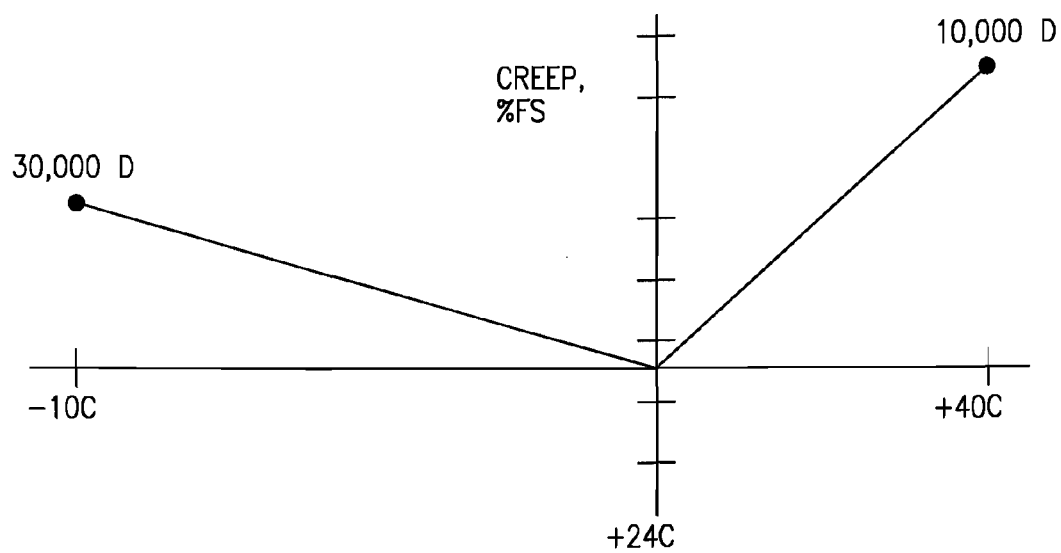
FIG. 11 is a graph showing a plot of transducer creep when a using strain gages with identical end loops.

Using the above example, a plot of the resulting transducer creep TC, which by default includes room temperature creep, is shown in FIG. 10. In FIG. 11 is a plot of the equivalent transducer creep TC when a prior method of creep correction is used; specifically, strain gages with identical end loops. The improvement achieved is demonstrated by a much flatter creep TC curve, thus providing equivalent creep compensation at all three test temperatures, and, thus, allowing a higher legal-for-trade transducer classification.

Figure 12:
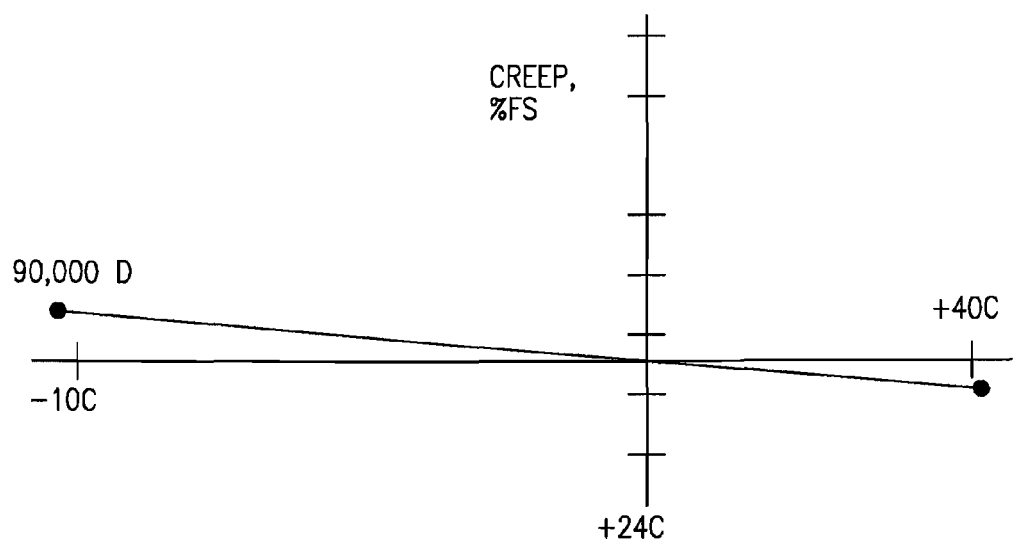
FIG. 12 is a graph showing a plot of transducer creep when combining physical and electrical cancellation.

The present invention has the additional benefit that is compatible with and can be combined in the same transducer with the prior methods to almost completely eliminate creep TC. Specifically, prior methods utilize strain gages so that the combined tension/compression strain gage creep cancels the physical creep of the transducer element and the present invention selects strain gages so that the positive and negative creeping characteristic cancel each other. By combining physical and electrical cancellation, the variation of creep with temperature is almost completely eliminated as illustrated in FIG. 12.

It will be understood by those of skill in the art that the present invention cancels only the variable component know generally as creep and that the desired measurement the transducer is not cancelled.

What is claimed is:

1. A transducer comprising:
a counterforce subjected to a predetermined physical load that provides tension and compression strains (positive and negative, respectively);
a plurality of strain gage grids that are operatively attached to said counterforce in the tension and compression strain areas of said counterforce and generate electrical signals; and,
said plurality of strain gages are electrically connected in a Wheatstone bridge circuit, wherein the electrical creep signals are substantially equal in magnitude and of the same sign between tension and compression strain areas, and when the equal electrical creep signals from the tension and compression strain areas are combined in the Wheatstone bridge circuit, the electrical creep signals are electrically cancelled.

2. A temperature compensated transducer comprising:
a counterforce subjected to a predetermined physical load that provides tension and compression strains that are positive and negative, respectively;
a plurality of strain gage grids that are operatively attached to said counterforce in said tension and compression strain areas and compensate for the physical changes in the counterforce at a predetermined temperature T; and, said plurality of strain gages generate electrical signals through the temperature range that is T+/−200° C.; and
said plurality of strain gages are electrically connected in a Wheatstone bridge circuit, wherein the electrical creep signals are substantially equal in magnitude and of the same sign between tension and compression strain areas, and when the equal electrical creep signals from the tension and compression strain areas are combined in the Wheatstone bridge circuit, the electrical creep signals are electrically cancelled throughout the temperature range T+/−200° C.

3. A temperature compensated transducer comprising:
a counterforce that support a predetermined physical load that provides tension and compression strains that are positive and negative, respectively;
a plurality of strain gage grids, operatively attached to said counterforce in said tension and compression strain areas in compensation for the physical changes in the counterforce at a predetermined temperature T, said plurality of strain gages generate electrical signals, that include a creep component, through a temperature range that includes T; and,
said plurality of strain gages are electrically connected in a Wheatstone bridge circuit, wherein the electrical creep signals are substantially equal in magnitude and of the same sign between tension and compression strain areas, and when the equal electrical creep signals from the tension and compression strain areas are combined in the Wheatstone bridge circuit, the electrical creep signals are electrically cancelled throughout the temperature range.

4. A method of manufacturing a transducer, the method comprising:
forming a transducer having a counterforce subjected to a predetermined physical load that provides tension and compression strains (positive and negative, respectively);
providing a plurality of strain gage grids that are operatively attached to the counterforce in the tension and compression strain areas of the counterforce and generate electrical signals; and
connecting the plurality of strain gages in a Wheatstone bridge circuit, wherein the electrical creep signals are substantially equal in magnitude and of the same sign between tension and compression strain areas, and when the equal electrical creep signals from the tension and compression strain areas are combined in the Wheatstone bridge circuit, the electrical creep signals are electrically cancelled.

5. The method of claim 4, wherein the plurality of strain gage grids that are operatively attached to the counterforce in the tension and compression strain areas and compensate for the physical changes in the counterforce at a predetermined temperature T, and the plurality of strain gages generate electrical signals through the temperature range that is T+/−200° C.

* * * * *